(12) United States Patent
Surprise et al.

(10) Patent No.: US 10,943,051 B1
(45) Date of Patent: Mar. 9, 2021

(54) METAL FILL SHAPE REMOVAL FROM SELECTED NETS

(71) Applicant: INTERNATIONAL BUSINESS MACHINES CORPORATION, Armonk, NY (US)

(72) Inventors: Jesse Surprise, Highland, NY (US); Gerald Strevig, III, Cedar Park, TX (US); Shawn Kollesar, Poughkeepsie, NY (US); Chris Aaron Cavitt, Poughkeepsie, NY (US); Chaobo Li, Wappingers Falls, NY (US); Dina Hamid, Bethesda, MD (US); Christopher Berry, Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/565,851

(22) Filed: Sep. 10, 2019

(51) Int. Cl.
  *G06F 30/398* (2020.01)
  *G06F 30/33* (2020.01)
  (Continued)

(52) U.S. Cl.
  CPC .......... *G06F 30/398* (2020.01); *G06F 30/33* (2020.01); *G06F 30/394* (2020.01); *H01L 23/522* (2013.01)

(58) Field of Classification Search
  CPC .... G06F 30/398; G06F 30/33; G06F 30/3954; G06F 2119/18; G06F 30/39; G06F 30/394; H01L 23/522; H01L 2924/0002; H01L 2924/00; H01L 23/5252; H01L 23/5256; H01L 27/24; Y02P 90/265
  See application file for complete search history.

(56) References Cited

U.S. PATENT DOCUMENTS 6,609,235 B2   8/2003   Ramaswamy et al.
7,240,314 B1   7/2007   Leung
(Continued)

OTHER PUBLICATIONS

Stine, et al., "The Physical and Electrical Effects of Metal-Fill Patterning Practices for Oxide Chemical-Mechanical Polishing Processes," IEEE Transactions on Electron Devices, vol. 45, No. 3, Mar. 1998, pp. 665-679.

(Continued)

*Primary Examiner* — Vuthe Siek
(74) *Attorney, Agent, or Firm* — Cantor Colburn LLP; William Kinnaman

(57) ABSTRACT

Methods, systems and computer program products for improved metal fill shape removal from selected nets are provided. Aspects include determining a first set and second set of timing characteristics of a first and second circuit design, respectively. The first circuit design does not include metal fill shapes around a plurality of nets, whereas the second circuit design does include metal fill shapes around a plurality of nets. Aspects also include identifying a set of candidate nets based on a comparison of the first set of timing characteristics to the second set of timing characteristics. The set of candidate nets are nets that are candidates for metal fill shape removal. Aspects include generating a third circuit design by removing one or more metal fill shapes positioned around each net of the set of candidate nets that are positioned within a radius of removal.

20 Claims, 11 Drawing Sheets

(51) Int. Cl.
*G06F 30/394* (2020.01)
*H01L 23/522* (2006.01)

(56) References Cited

U.S. PATENT DOCUMENTS

| | | | | |
|---|---|---|---|---|
| 7,661,078 B1* | 2/2010 | Noice | ............ | G06F 30/39 |
| | | | | 716/136 |
| 8,612,913 B1* | 12/2013 | Peart | ............ | G06F 30/3312 |
| | | | | 716/113 |
| 8,789,005 B1* | 7/2014 | Umino | ............ | G06F 30/39 |
| | | | | 716/135 |
| 2007/0101305 A1 | 5/2007 | Smith et al. | | |

OTHER PUBLICATIONS

Transmittal Form PTO/SB/21, signed Mar. 17, 2020.

* cited by examiner

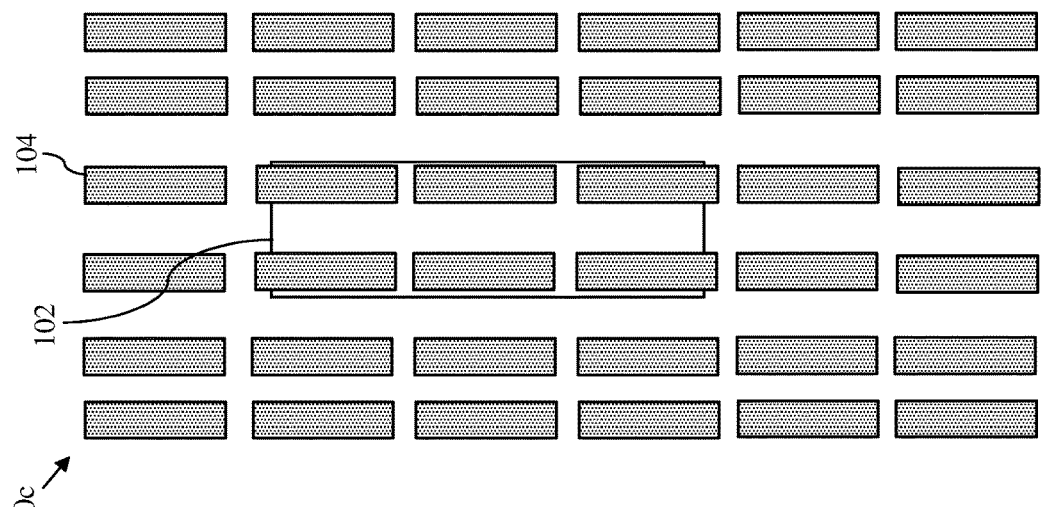
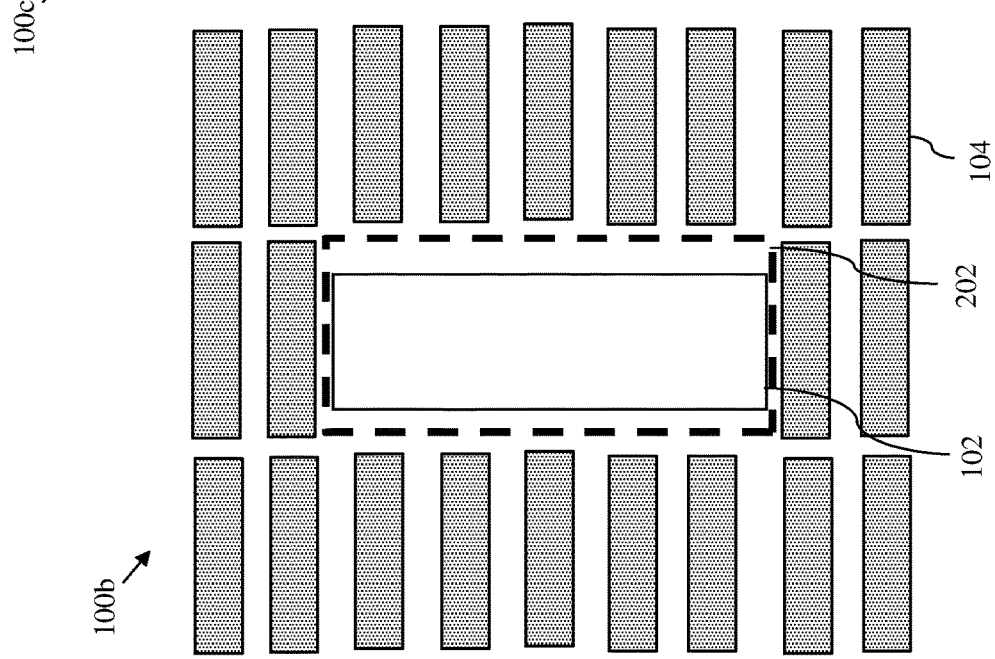
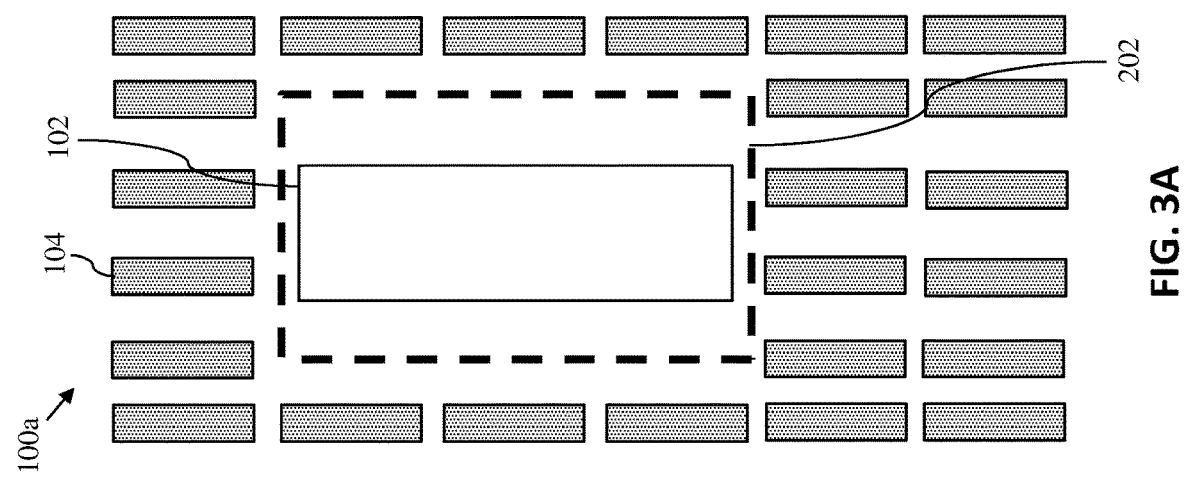

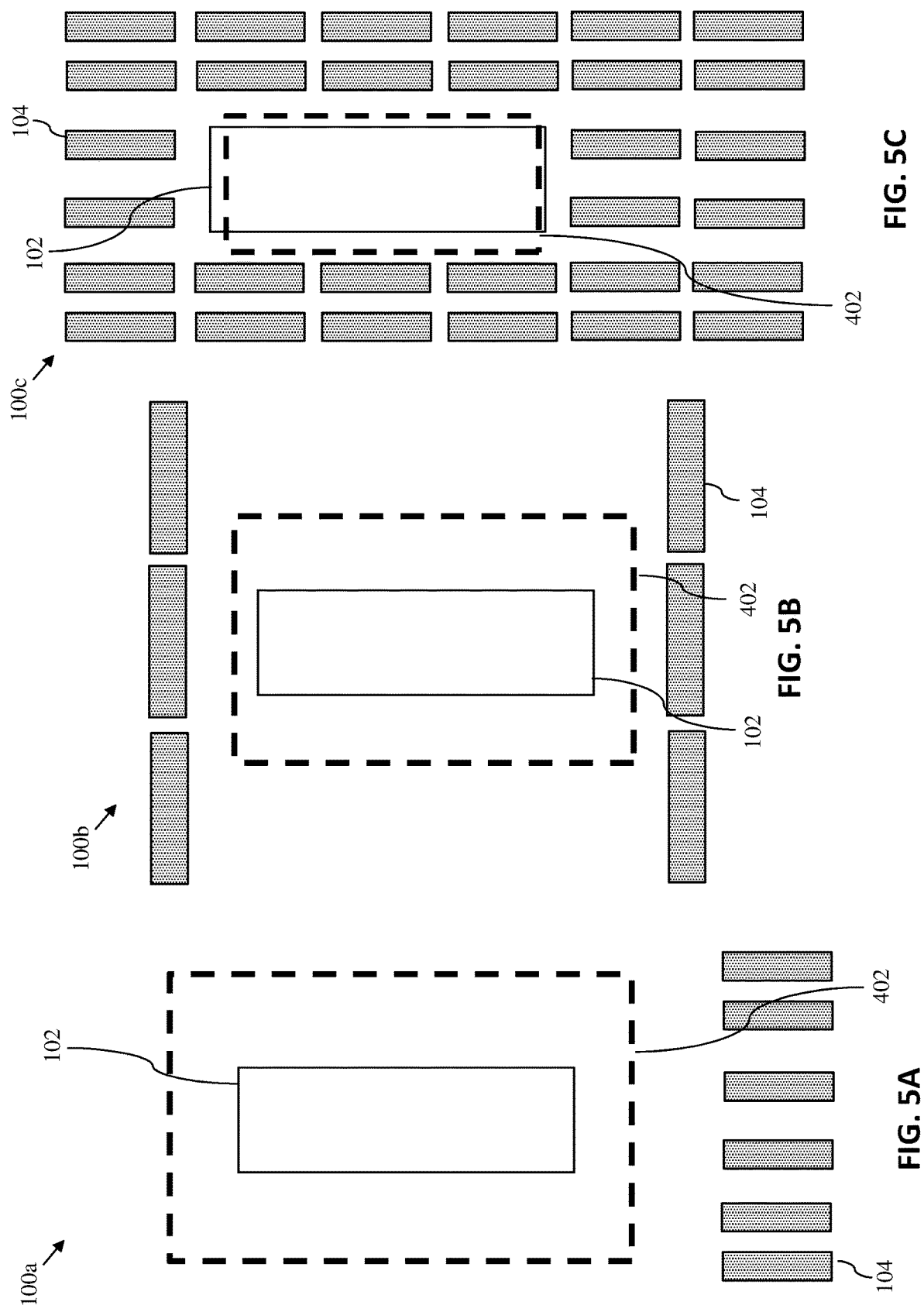

METAL FILL SHAPE REMOVAL FROM SELECTED NETS

BACKGROUND

The present invention generally relates to the fabrication and design of semiconductor chips and integrated circuits, and more specifically, to providing improved metal fill shape removal from selected nets.

A microelectronic integrated circuit (IC) chip can generally be thought of as a collection of logic cells with electrical interconnections between the cells, formed on a semiconductor substrate (e.g., silicon). An IC may include a very large number of cells and require complicated connections between the cells. Cell placement in semiconductor fabrication involves a determination of where particular cells should optimally (or near-optimally) be located on the surface of an integrated circuit device. The design of such IC's generally have various design requirements, such as timing requirements, that must be satisfied by the placement of various circuit elements (e.g., cells, latches, local clock buffers, etc.). Circuit designs are also commonly subject to minimum density requirements, which can be met by adding metal till to portions of the circuit design to add extra density.

SUMMARY

Embodiments of the present invention are directed to providing improved metal fill shape removal from selected nets. A non-limiting example of the computer-implemented method includes determining a first set of timing characteristics of a first circuit design. The first circuit design does not include metal fill shapes around a plurality of nets. The method also includes determining a second set of timing characteristics of a second circuit design. The second circuit design includes all elements of the first circuit design and further includes metal fill shapes positioned around one or more of the plurality of nets. The method also includes identifying a set of candidate nets of the one or more of the plurality of nets based on a comparison of the first set of timing characteristics to the second set of timing characteristics. The set of candidate nets includes nets that are candidates for metal fill shape removal. The method also includes defining a radius of removal for the set of candidate nets. The method also includes generating a third circuit design by removing one or more metal fill shapes positioned around each net of the set of candidate nets that are positioned within the radius of removal.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3A illustrates a first layer of a circuit design that has had metal fill shapes removed based on the first removal area in accordance with one or more embodiments of the present invention;

FIG. 3B illustrates a second layer of a circuit design that has had metal fill shapes removed based on the first removal area in accordance with one or more embodiments of the present invention;

FIG. 3C illustrates a third layer of a circuit design that has no metal fill shapes removed based on the first removal area in accordance with one or more embodiments of the present invention;

FIG. 5A illustrates a first layer of a circuit design that has had metal fill shapes removed based on the second removal area in accordance with one or more embodiments of the present invention;

FIG. 5B illustrates a second layer of a circuit design that has had metal fill shapes removed based on the second removal area in accordance with one or more embodiments of the present invention;

FIG. 5C illustrates a third layer of a circuit design that has metal fill shapes removed based on the second removal area in accordance with one or more embodiments of the present invention;

Figure 1C:
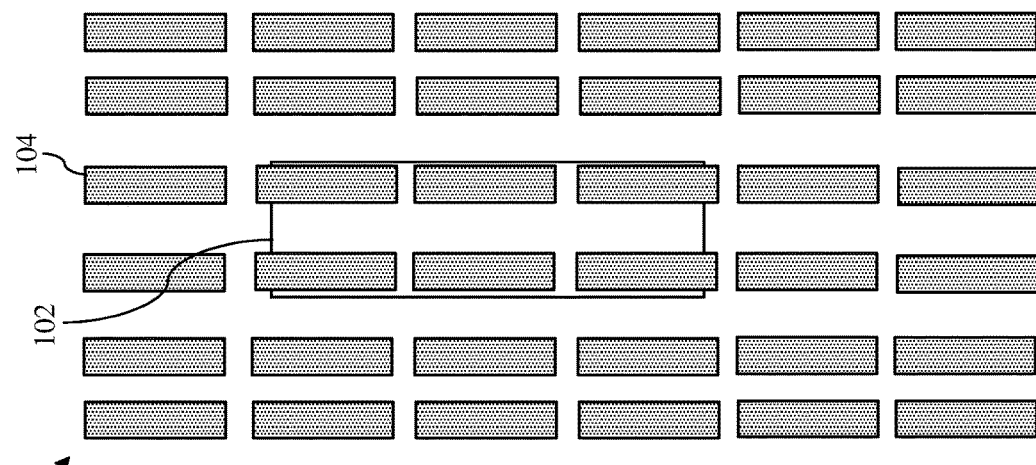
FIG. 1C illustrates a third layer of a circuit design having a net that is fully surrounded by metal fill shapes in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Integrated circuits are used for a wide variety of electronic applications, from simple devices such as wristwatches to the most complex computer systems. A microelectronic integrated circuit (IC) chip can generally be thought of as a collection of logic cells with electrical interconnections between the cells, formed on a semiconductor substrate (e.g., silicon). An IC may include a very large number of cells and require complicated connections between the cells. A cell is a group of one or more circuit elements such as transistors, capacitors, resistors, inductors, and other basic circuit elements grouped to perform a logic function. Cell types include, for example, core cells, scan cells and input/output (I/O) cells. Each of the cells of an IC may have one or more pins, each of which in turn may be connected to one or more other pins of the IC by wires. The wires connecting the pins of the IC are also formed on the surface of the chip. For more complex designs, there are typically at least four distinct layers of conducting media available for routing, such as a polysilicon layer and three metal layers (metal-1, metal-2, and metal-3). The polysilicon layer, metal-1, metal-2, and metal-3 are all used for vertical and/or horizontal routing.

An IC chip is fabricated by first conceiving the logical circuit description, and then converting that logical description into a physical description, or geometric layout. This process is usually carried out using a "netlist," which is a record of all of the nets, or interconnections wiring, between the cell pins. A layout (which may be referred to as "a circuit design") typically includes of a set of planar geometric shapes in several layers. The layout is then checked to ensure that it meets all of the design requirements, particularly timing requirements. The result is a set of design files known as an intermediate form that describes the layout. The design files are then converted into pattern generator files that are used to produce patterns called masks by an optical or electron beam pattern generator. During fabrication, these masks are used to pattern a silicon wafer using a sequence of photolithographic steps. The process of converting the specifications of an electrical circuit into a layout is called the physical design.

Cell placement in semiconductor fabrication involves a determination of where particular cells should optimally (or near-optimally) be located on the surface of an integrated circuit device. Due to the large number of components and the details required by the fabrication process for very large scale integrated (VLSI) devices, physical design is not practical without the aid of computers. As a result, most phases of physical design extensively use computer-aided design (CAD) tools, and many phases have already been partially or fully automated. Automation of the physical design process has increased the level of integration, reduced turnaround time and enhanced chip performance. Several different programming languages have been created for electronic design automation (EDA) including Verilog, very high speed integrated circuit hardware description language (VHDL) and time division multiplexing logic (TDML). A typical EDA system receives one or more high level behavioral descriptions of an IC device, and translates this high level design language description into netlists of various levels of abstraction.

Turning now to an overview of technologies that are more specifically relevant to aspects of the invention, integrated circuit designs are typically back-filled with metal fill (e.g., copper) around the nets to meet density requirements. Such back-filling of metal fill around nets can be conventionally achieved using a filling routine or algorithm that adds metal fill shapes around the nets within the circuit design. Such metal fill shapes that are included in an electronic circuit design file represent designated areas and/or volumes of metal fill that will be physically integrated into the circuit (around the nets) at the time of physical circuit/wafer fabrication. When designing circuit layouts, timing optimization is generally performed using circuit design files that do not include the metal fill present, but the later of addition of metal fill can create additional capacitance on nets in the design which create timing failures and other electrical characteristic failures within the circuit. The additional capacitance creates a larger resistance x capacitance ("RC") delay potential on the net causing setup failures (e.g., the signal arrives at the destination too late) and transition time failures (e.g., the signal takes too long to switch values from one logic level to another). Further, conventional metal fill routines typically result in providing more metal fill than necessary to meet the minimum density requirements, resulting in wasted materials and heavier than necessary end products. In conventional approaches, metal fill is generally added during the fabrication process and so no timing analysis would be performed on the design that includes metal fill.

Turning now to an overview of the aspects of the invention, one or more embodiments of the invention address one or more of the above-described shortcomings of the prior art by providing techniques for removing (or moving) portions of metal fill (i.e., metal fill shapes) from selected nets. The metal fill shapes may have initially been placed by a metal fill routine that may have added more metal fill to the circuit design than necessary. The techniques disclosed herein can remove excess metal fill to avoid timing/electrical failures otherwise caused by the metal fill without having to reconfigure other elements of the circuit design, which can be difficult and time-consuming to the complex nature of circuit designs/layouts. The techniques disclosed herein can run timing simulations on a version of the circuit design that has no metal fill shapes and a version of the circuit design that includes metal fill shapes and compare the timing characteristics of each simulation to identify nets that are candidates for metal fill shape removal. This allows an "apples to apples" comparison by comparing simulations performed on circuit designs that are identical other than the inclusion/exclusion of the metal fill shapes. In this way, the effect of the metal fill shapes on each individual net can be ascertained and problematic nets (i.e., nets that are surrounded by metal fill shapes that cause unacceptable timing problems) can be identified while other nets that do not present timing problems can be dismissed from consideration.

Once the candidate nets are identified, metal fill shapes that fall within a specified distance or radius of the nets can be removed to create a new circuit design that includes less metal fill shapes. Another simulation can be performed on the new circuit design to determine new timing characteristics, which can then be compared against the timing characteristics of the circuit design that does not include any metal fill shapes to identify a new set of candidate nets. Once the new candidate nets are identified, metal fill shapes that fall within a new, larger specified distance or radius of the nets can be removed to create another new circuit design that includes even less metal fill shapes. This process can be continued iteratively until either there are no candidate nets left (i.e., the removal of metal fill shapes has eliminated all timing problems) or until the removal of the metal fill shapes has reached a maximum limit. In this way, the disclosed techniques can provide for removal of metal fill shapes in a manner that is individualized to each net and can result in the elimination of timing failures without requiring a rearrangement of other circuit elements.

Figure 1B:
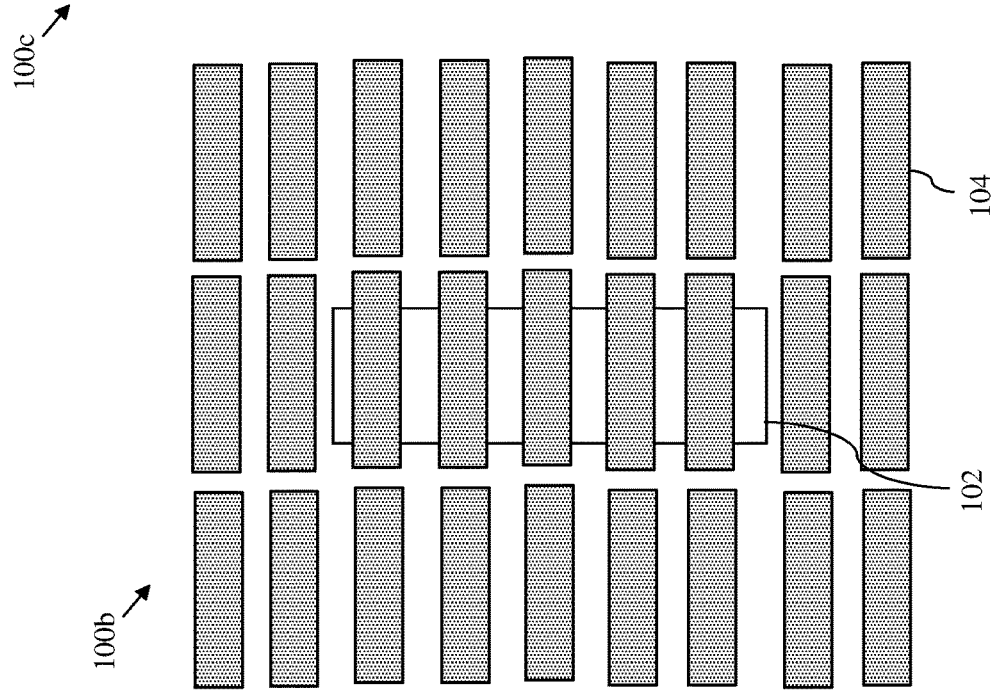
FIG. 1B illustrates a second layer of a circuit design having a net that is fully surrounded by metal fill shapes in accordance with one or more embodiments of the present invention.
Figure 1A:
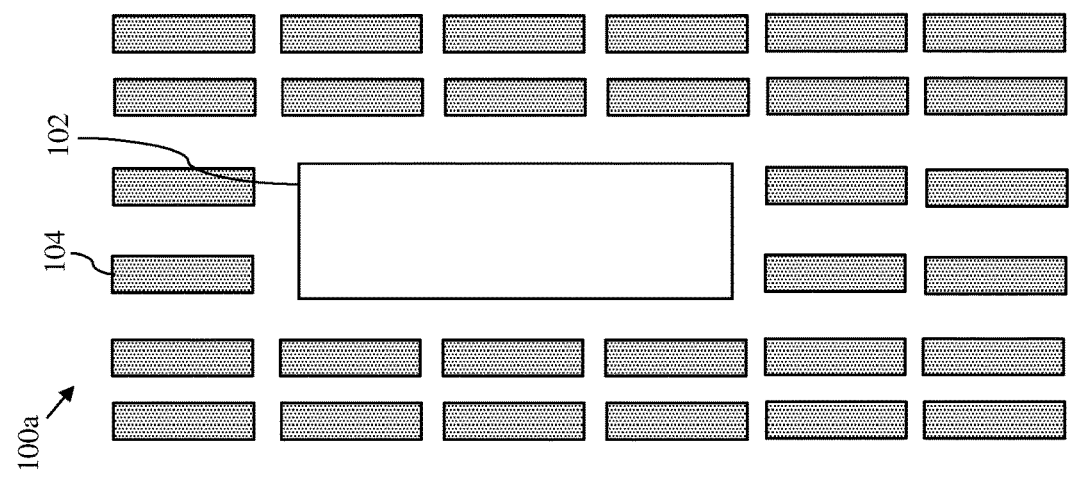
FIG. 1A illustrates a first layer of a circuit design having a net that is fully surrounded by metal fill shapes in accordance with one or more embodiments of the present invention.

Turning now to a more detailed description of aspects of the present invention, FIGS. 1A, 1B and 1C depict different layers of a circuit design having a net 102 surrounding by a plurality of metal fill shapes 104. As will be appreciated by those of skill in the art, an integrated circuit typically has a 3-dimensional design, with different circuit elements and/or shapes being positioned in different layers of the design (e.g., such as layers M1, M2, M3 . . . M8). The layers may be vertically stacked on top of one another such that, for example, a layer M5 would be disposed between layers M4 and M6. FIG. 1A depicts a first layer 100a of a circuit design in which it can be clearly seen that the net 102 is surrounded on all sides by a plurality of metal fill shapes 104. The first layer 100a may be a layer that contains the net 102 itself, as well as multiple surrounding metal fill shapes 104. FIG. 1B depicts a second layer 100b of the circuit design, which can be disposed either directly above or below the first layer 100a within the circuit design. Similarly, FIG. 1C depicts a third layer 100c of the circuit that can be above or below the second layer 100b of the circuit design. Thus, it will be appreciated that FIGS. 1A, 1B and 1C present a 3-dimensional representation of the net 102 and the surrounding layers of metal fill shapes 102. For example, in some embodiments, the first layer 100a could be layer M5, the second layer 100b could be layer(s) M4 and/or M6 and the third layer 100c could be layer(s) M3 and/or M7. It should be understood that this is merely an example and the techniques described herein could be applied to any set of adjacent layers.

As previously described above, a conventional metal fill algorithm may have a tendency to overfill and generate many more metal fill shapes 104 than are needed to meet a minimum density requirement. Thus, a conventional metal fill shape filling algorithm may fill in a circuit design with metal fill shapes 104 around a net 102 in a manner that can result in a configuration that is shown in FIGS. 1A, 1B and 1C (i.e., where the net can be said to be fully surrounded by metal fill shapes 104). Although the Figures show empty spaces between each metal fill shape 104, it should be understood that the empty spaces are filled with an insulating dielectric or a similar material that can prevent the metal fill shapes 104 from touching one another and can provide electrical insulation to prevent shorts from occurring.

Figure 2C:
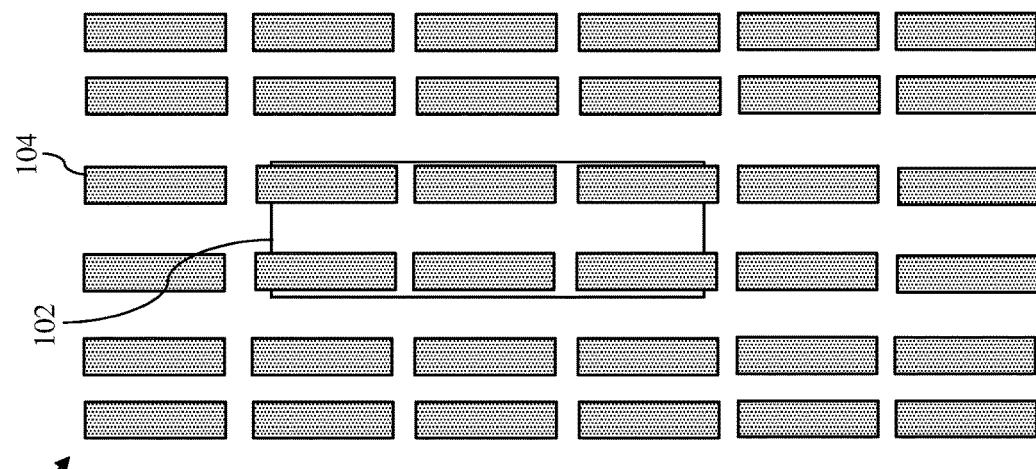
FIG. 2C illustrates a first removal area superimposed on a third layer of a circuit design that has a net that is fully surrounded by metal fill shapes in accordance with one or more embodiments of the present invention.
Figure 2B:
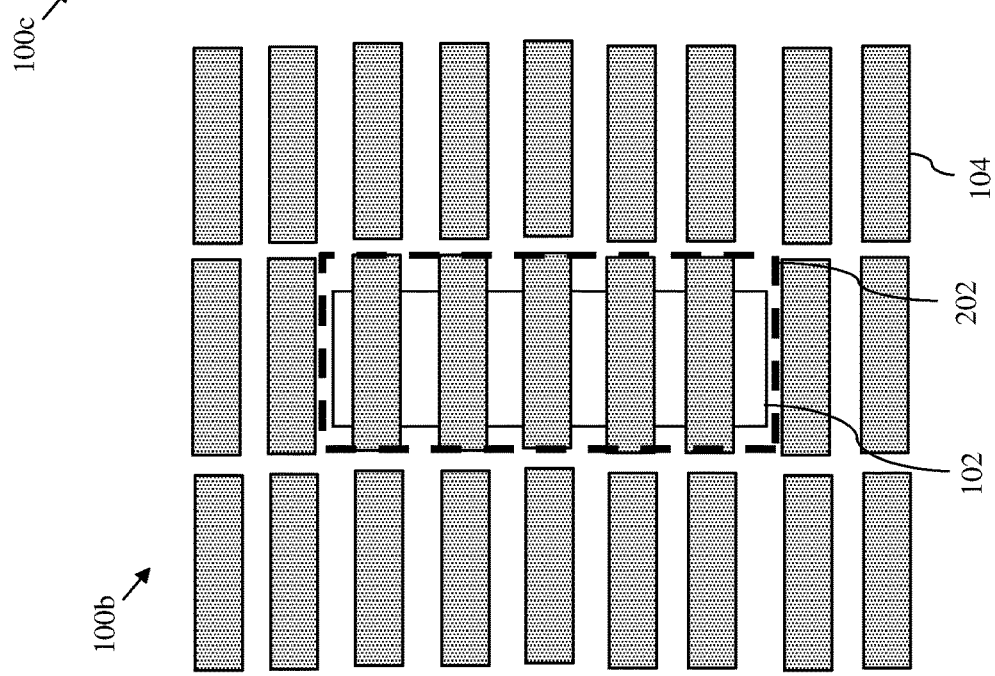
FIG. 2B illustrates a first removal area superimposed on a second layer of a circuit design that has a net that is fully surrounded by metal fill shapes in accordance with one or more embodiments of the present invention.
Figure 2A:
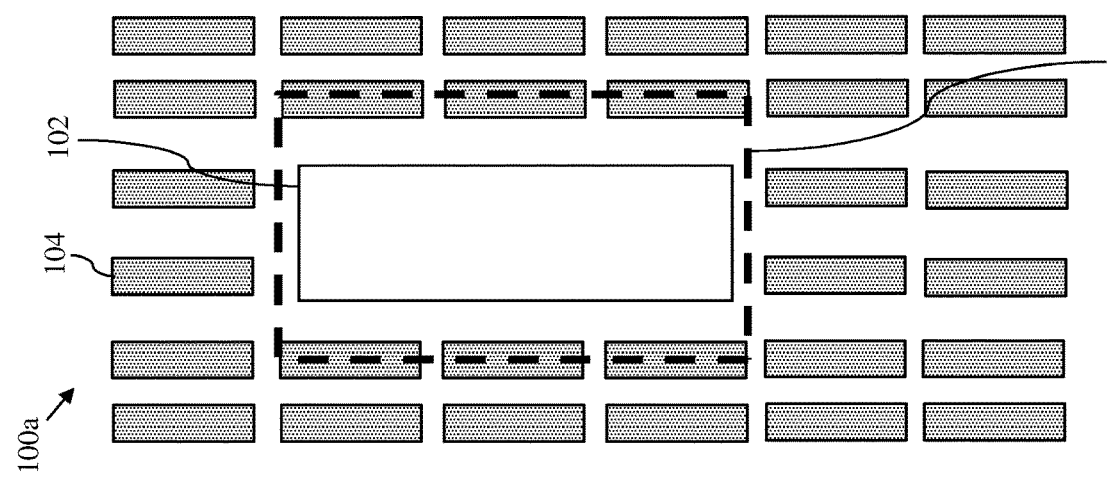
FIG. 2A illustrates a first removal area superimposed on a first layer of a circuit design that has a net that is fully surrounded by metal fill shapes in accordance with one or more embodiments of the present invention.

FIGS. 2A, 2B and 2C depict a first removal area 202 that is superimposed on the respective layers 100a, 100b, 100c of the circuit design. The first removal area 202 may be generated based on a first specified radius of removal, such as, for example, a radius that is equivalent to 3 times the width of net 102. The first removal area 202 may be determined by, for example, defining a circumference around the net 102 using the first specified radius of removal as a radius. According to some embodiments the first removal area 202 may cover an area that is defined by extending the first specified radius of removal from each edge of the net 102. As shown in FIGS. 2A and 2B, the first removal area 202 may encompass some portion of several metal fill shapes 104 in the first layer 100a and the second layer 100b. However, as shown in FIG. 2C, the first removal area 202 may not encompass any portions of the metal fill shapes 104 in the third layer 100c, as these metal fill shapes 104 are out of range of the first specified radius of removal.

FIGS. 3A, 3B and 3C depict the results of a process of removing metal fill shapes 104 in the first removal area 202. As shown in FIGS. 3A and 3B, multiple metal fill shapes 104 within the first removal area 202 have been removed from the first layer 100a and the second layer(s) 100b of the circuit design. As shown in FIG. 3C, the third layer(s) 100c of the circuit design remain untouched, as the first removal area 202 did not extend into the third layer(s) 100c. According to some embodiments, metal fill shapes 104 that are at least partially encompasses by a removal area/radius of removal can be removed. In some embodiments, metal fill shapes 104 can only be removed if they are entirely encompassed by the removal area/radius of removal. As shown in FIGS. 3A, 3B and 3C, following the removal of metal fill shapes 104 based on the first removal area, the area around the net 104 is now only partially filled with metal fill shapes 104.

Figure 4A:
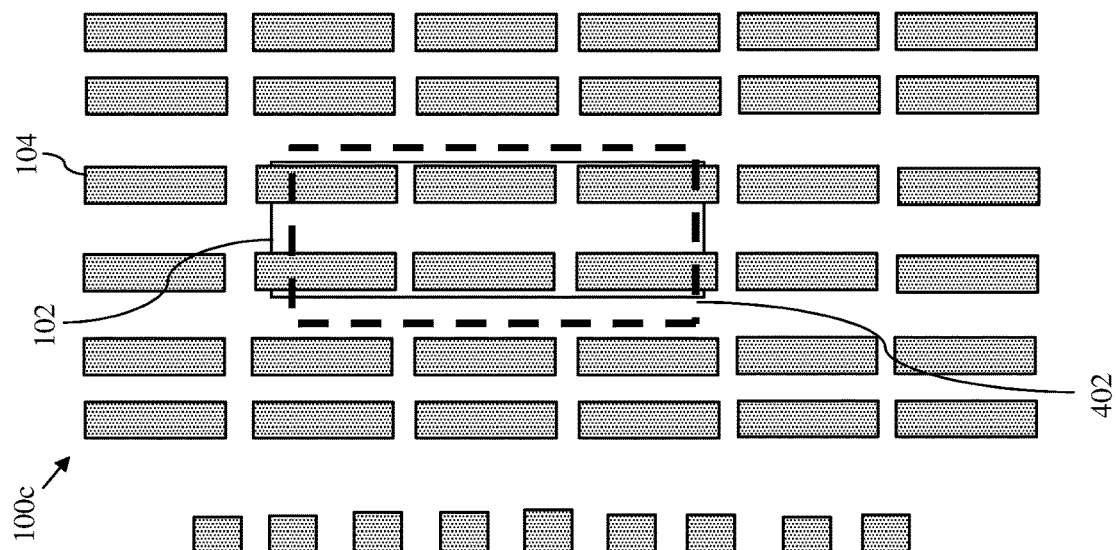
FIG. 4A illustrates a second removal area superimposed on a first layer of a circuit design that has a net that is partially surrounded by metal fill shapes in accordance with one or more embodiments of the present invention.
Figure 4B:
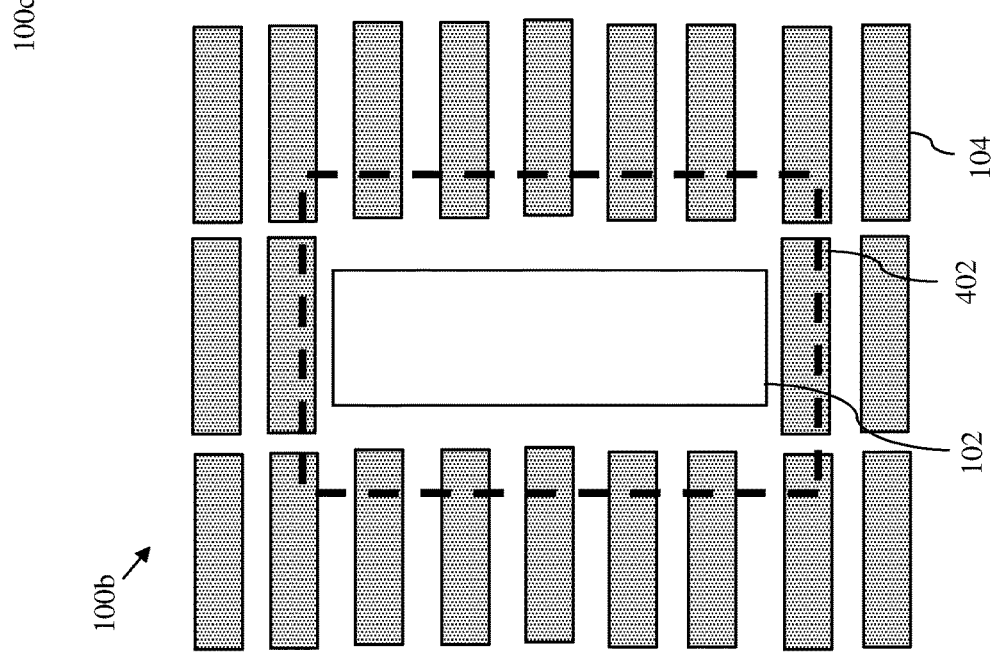
FIG. 4B illustrates a second removal area superimposed on a second layer of a circuit design that has a net that is partially surrounded by metal fill shapes in accordance with one or more embodiments of the present invention.
Figure 4C:
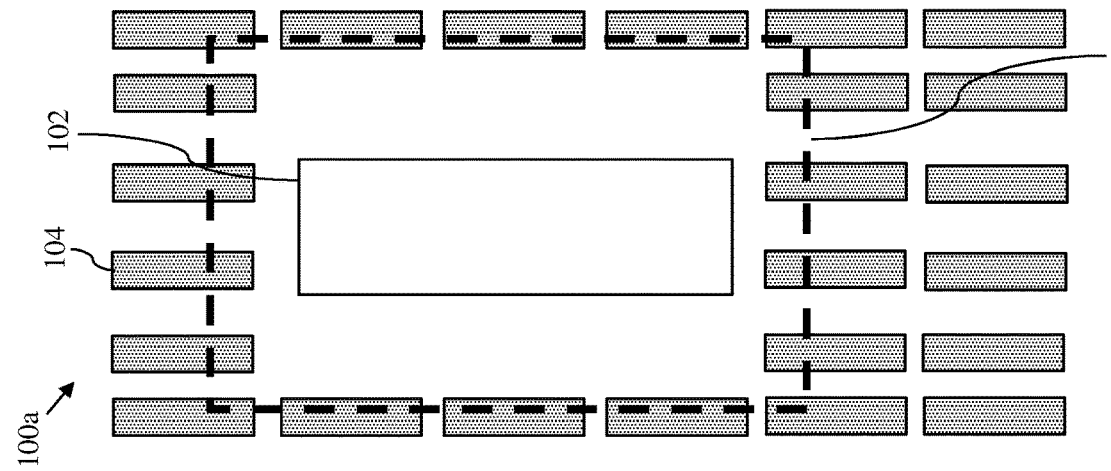
FIG. 4C illustrates a second removal area superimposed on a third layer of a circuit design that has a net that is partially surrounded by metal fill shapes in accordance with one or more embodiments of the present invention.

FIGS. 4A, 4B and 4C depict a second removal area 402 that is superimposed on the respective layers 100a, 100b, 100c of the circuit design. The second removal area 402 may be generated based on a second specified radius of removal, such as, for example, a radius that is equivalent to 5 times the width of net 102. The exact length of any given radius of removal can be predetermined or adjusted by a designer, based on the level of granularity desired. Generally, each successive specified radius of removal will be larger than the last. As shown in FIGS. 4A, 4B and 4C, the second radius of removal can extend to metal fill shapes 104 that are further away from the net 102 within the first layer 100a and the second layer(s) 100b of the circuit design, and can additionally extend to metal fill shapes 104 disposed in the third layer(s) 100c of the circuit design. According to some embodiments, various radii of removal (e.g., relating to a particular iteration) can be a predetermined distance that is a function of the width of the net. For example, in some embodiments, the first radius of removal can be 3 times the width of the net, the second radius of removal can be 5 times the width of the net, the third radius of removal can be 10 times the width of the net, and so on. It should be understood that the preceding set of radii of removals are merely exemplary and that in various embodiments, various different lengths of radii of removal can be used. In some embodiments, the various radii of removal may be predetermined distances that can be selected by a user.

FIGS. 5A, 5B and 5C depict the results of a process of removing metal fill shapes 104 in the second removal area 402. Removal of metal fill shapes 104 from the second removal area 402 can occur in the same manner as described above with respect to the first removal area 202. As shown by FIG. 5A, another set of metal fill shapes 104 have been removed from the first layer 100*a* and second layer(s) 100*b*, leaving large gaps between the net 102 and the remaining metal fill shapes 104 in these layers. These gaps can represent an insulating dielectric material. Similarly, a number of metal fill shapes 104 have been removed from the third layer 100*c* as shown in FIG. 5C. This process of defining a larger removal area and removing additional metal fill shapes can be performed iteratively to continue to remove metal fill shapes 104 until a desired outcome is achieved (e.g., no timing failures have been detected) or until a maximum allowable radius of removal has been reached. According to some embodiments, a maximum allowable radius of removal can be defined by 10 times the width of net 102. According to some embodiments, the maximum allowable radius of removal can be selected to be a distance at which the capacitance effects of the metal fill are so minimal or non-existent that there is no significant effect to continued removal of the metal fill.

Figure 6:
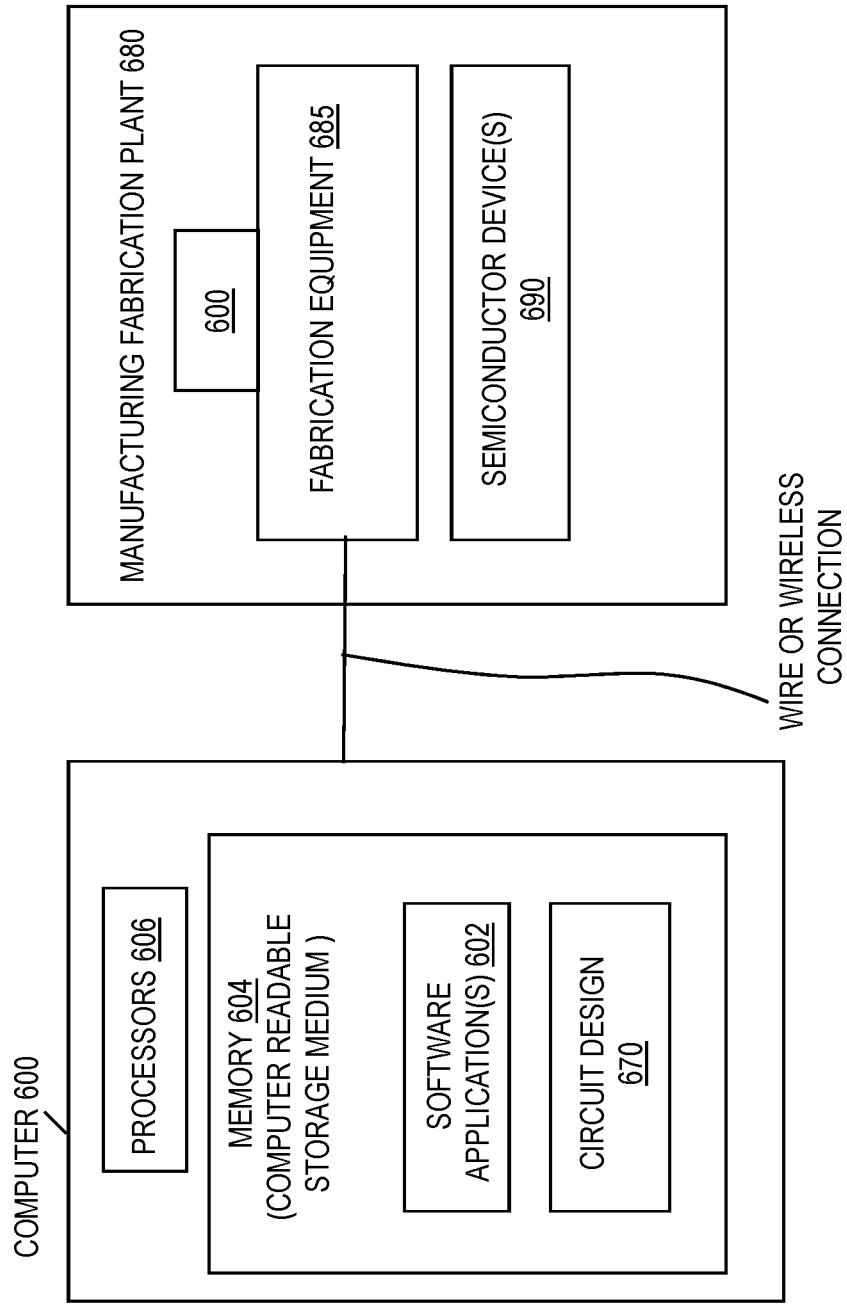
FIG. 6 depicts a system of a computer system integrated with a manufacturing fabrication plant according to one or more embodiments of the invention.

According to some embodiments, a circuit design (e.g., a circuit layout or semiconductor layout) that includes various layers, such as the example layers 100*a*, 100*b*, 100*c* shown in FIGS. 1A through 5C can be generated using the computer system 600 shown in FIG. 6. Although only a small portion of a circuit design is shown in the examples depicted in FIGS. 1A through 5C, those of skill in the art will recognize that a circuit design may be made up of macro blocks having rows that are occupied by various cells (with each cell containing one or more transistors) that provides a useful layer of hierarchical abstraction for designing an integrated circuit that may contain billions of transistors. The computer system 600 has one or more software applications 602 configured to function and implement operations as discussed herein. For example, software applications 602 may include one or more metal fill shape removal routines for iteratively removing metal fill shapes 104 from one or more layers around a net 102 in accordance with one or more specified radiuses of removal. The software applications 602 may also be configured to identify one or more candidate nets based on the execution of timing simulations and comparison of timing characteristics as described in greater detail below.

According to some embodiments, software applications 402 can provide place and fill routines for placing functional cells and fill cells in order to complete a semiconductor layout or circuit design. A semiconductor layout can be constructed by the software application 602 of the computer 600 to build the semiconductor device (e.g., an integrated circuit). The computer 600 can be configured to guarantee design rule cleanliness (i.e., pass) for a semiconductor device before and/or without requiring a design rule check. The software applications 602 include, integrate, are coupled to, and/or function as electronic design automation (EDA), also referred to as electronic computer-aided design (ECAD). Electronic design automation is a category of software tools for designing electronic systems such as integrated circuits and printed circuit boards. The tools work together in a design flow that chip designers use to design and analyze entire semiconductor chips. In some implementations, the computer 600 is coupled to, integrated with, and/or part of the fabrication equipment 685 at the manufacturing fabrication plant 680 (so as to communicate with and/or control operations of the fabrication equipment 685) to thereby fabricate semiconductor device(s) 690 as depicted in FIG. 6, as understood by one skilled in the art.

The computer 600 includes one or more processors 606 configured to execute one or more software applications 402 in memory 604. The computer 600 receives input of a design 670 for the semiconductor device 690, and the computer 600 is configured to develop/form the semiconductor layout for the semiconductor device in order to build the semiconductor device. The semiconductor layout is a physical design released to the manufacturing fabrication (Fab) plant 680 and physically fabricated by the fabrication equipment 685 to produce the semiconductor device 690. The manufacturing fabrication plant 680 builds the photo mask from the semiconductor layout as a physical design, and then builds the actual product using the photo mask. The product is an integrated circuit (i.e., semiconductor device 690) on a wafer according to the semiconductor layout (physical design). There may be numerous integrated circuits on a wafer, and each integrated circuit may be diced into an individual chip.

Figure 7:
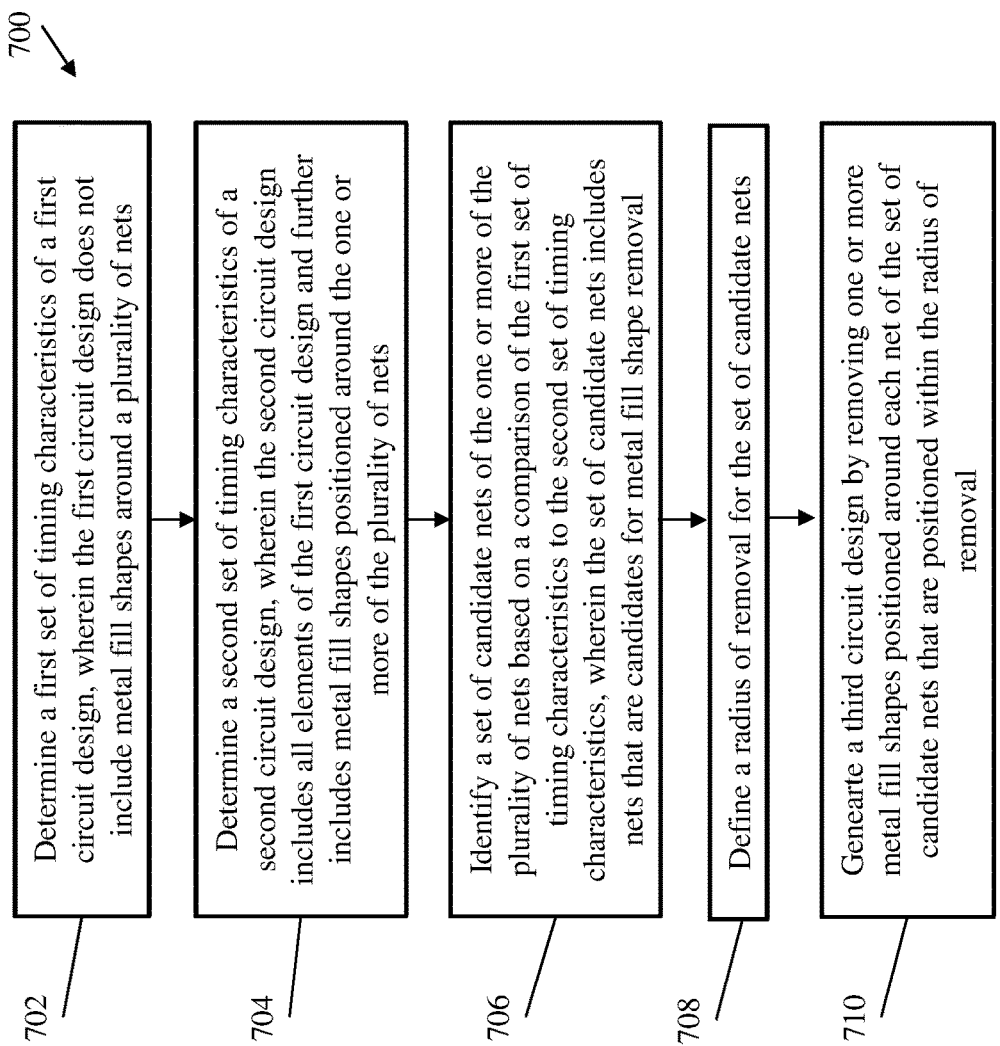
FIG. 7 illustrates a flow diagram of a process for providing improved metal fill shape removal from selected nets in accordance with one or more embodiments of the present invention.

Turning now to FIG. 7, a flow diagram of a method 700 for providing improved metal fill shape removal from selected nets in accordance with an embodiment is shown. In one or more embodiments of the present invention, the method 700 may be embodied in software that is executed by computer elements included in computer 600 shown in FIG. 6, or computer elements located within a network that may reside in the cloud, such as the cloud computing environment 50 described herein above and illustrated in FIGS. 9 and 10. In other embodiments, the computer elements may reside on a computer system or processing system, such as the processing system 1100 described herein above and illustrated in FIG. 11, or in some other type of computing or processing environment.

The method 700 begins at block 702 and includes determining (e.g., via computer 600) a first set of timing characteristics of a first circuit design, where the first circuit design does not include metal fill shapes around a plurality of nets. According to some embodiments, determining the first set of timing characteristics of the first circuit design can include running a first timing simulation on the first circuit design. As will be understood by those of skill in the art, in some embodiments a timing simulation can be a static timing analysis ("STA") that can be performed by generally available software or proprietary software Traditional STA is performed at specific corners whereas statistical STA covers a distribution of corners. A timing simulation can test a circuit design and output various timing characteristics and failures, such as slack (i.e., setup time or the latest time a signal needs to arrive at a destination latch), hold (i.e., hold time or the earliest time a signal can arrive at a destination latch), slew (i.e., a maximum time a signal can take to transition from one logic level to another), noise (i.e., coupling effects from neighboring nets that change the RC, effectively slowing down a given net which can in turn impact slack/slew), functional noise (i.e., coupling from neighbors that can cause the logical value of a net to flip), max % RC delay (i.e., a maximum delay of a net in terms of a percentage of RC delay vs. transistor delay), max capacitance (i.e., the maximum capacitance that the driver of a net is rated for) and other such measurements. According to some embodiments, each net of a plurality of nets included in the circuit design can have their own set of associated timing characteristics generated by the simulation, such that each net can be individually examined to determine whether its timing characteristics are acceptable according to the design requirements or whether they require adjustment.

As shown at block 704, the method includes determining (e.g., via computer 600) a second set of timing characteristics of a second circuit design. The second circuit design includes all elements of the first circuit design and further includes metal fill shapes positioned around one or more of the plurality of nets (such as the circuit designs shown in FIGS. 1A, 1B and 1C). In other words, the second circuit design is identical to the first circuit design but for the addition of the metal fill shapes around one or more nets. According to some embodiments, determining the second set of timing characteristics of the second circuit design includes running a second timing simulation on the second circuit design in a manner similar to or identical to the simulation run on the first circuit design. Each of the first set of timing characteristics and the second set of timing characteristics can be the same set of measurements so that an "apples to apples" comparison between the timing characteristics of the two circuit designs can be achieved. For example, for a particular net (that is included in both circuit designs), each set of timing characteristics (e.g., slack, slew, noise, capacity, etc.) from the two simulations can be compared to determine a difference for each characteristic.

As shown at block 706, the method includes identifying (e.g., via computer 600) a set of candidate nets of the one or more of the plurality of nets based on a comparison of the first set of timing characteristics to the second set of timing characteristics. The set of candidate nets includes nets that are candidates for metal fill shape removal. In other words, these are nets that have timing characteristics that do not meet a minimal level of acceptability according to design requirements, and thus may possibly be improved by removal of nearby metal fill shapes. Nets that are not identified as candidate nets can be nets that have timing characteristics that do meet a minimal level of acceptability according to design requirements. According to some embodiments, identifying a set of candidate nets of the one or more of the plurality of nets based on a comparison of the first set of timing characteristics to the second set of timing characteristics can include, for each net of the one or more of the plurality of nets: comparing a first subset of the first set of timing characteristics that are associated with the net to a second subset of the second set of timing characteristics that are associated with the net to determine a difference in timing characteristics and designating the net as being a candidate net in response to determining that the difference in timing characteristics exceeds a predetermined threshold. In other words, for a given net, a difference for each individual timing characteristic (e.g., a difference in slack, a difference in slew, a difference in noise, etc.) between the two simulations can be determined, and if the aggregate difference in selected timing characteristics for the net between the two simulations exceeds a threshold, then the net may be classified as a candidate net. According to some embodiments, the subset of timing characteristics used to identify the candidate nets can include all or less than every timing characteristic output by the simulation. In other words, in some embodiments, one or more particular timing characteristics may not be considered to be important with respect to meeting minimum timing requirements and therefore may be discarded for the purposes of identifying candidate nets. Conversely, in some embodiments, a net can be classified as a candidate net if the comparison of one or more specified timing characteristic results in a failure (i.e., the difference of the comparison for the characteristic exceeds a predetermined threshold). According to some embodiments, an aggregate difference can be a weighted average in differences between individual timing characteristics. According to some embodiments, one or more particular timing characteristics may be designated as high importance such that if a difference relating any of these particular timing characteristics exceeds a respective predetermined threshold then the net may be considered to be a candidate net regardless of the aggregate difference in timing characteristics. One of skill in the art will recognize than many different weightings or algorithms can be used to define what may flag a particular net surrounded by metal fill shapes as being a candidate net due to having too large of a difference from the equivalent net having no surrounding metal fill shapes.

As shown at block 708, the method includes defining (e.g., via computer 600) a radius of removal for the set of candidate nets. According to some embodiments, the radius of removal may have a predefined length, but may be defined or otherwise selected based on the number of removal iterations have occurred (e.g., with each new iteration utilizing in a larger radius of removal). In some embodiments, the radius of removal for a given iteration of removal may be determined in accordance with an algorithm that specifies the radius of removal based on which iteration the method is currently at. For example, in some embodiments, the radius of removal can be a function of the width of the net and the number of the current iteration of removal.

As shown at block 710, the method includes generating (e.g., via computer 600) a third circuit design by removing one or more metal fill shapes positioned around each net of the set of candidate nets that are positioned within the radius of removal (e.g., as shown by the example circuit design shown in FIGS. 3A, 3B and 3C). According to some embodiments, removing one or more metal fill shapes positioned around each net of the set of candidate nets that are positioned within the radius of removal can include, for each net of the one or more candidate nets: defining an area around the net having the radius of removal (e.g., as shown in FIGS. 2A, 2B and 2C), identifying one or more metal fill shapes that are positioned at least partially within the area around the net and removing the one or more metal fill shapes from the second circuit design.

According to some embodiments, the method 700 may further include determining a third set of timing characteristics of the third circuit design and identifying a new set of candidate nets based on a comparison of the first set of timing characteristics to the third set of timing characteristics. In other words, after the circuit design that initially was fully filled with metal fill shapes has some metal fill shapes removed, it may again be compared to the circuit design having no metal fill shapes following a new timing simulation to determine if any of the previous candidates nets now have improved timing characteristics following the metal fill shape removal. The new set of candidate nets includes a subset of the set of candidate nets, as some of the original candidates with improved timing may now be removed from the set. The method 700 may also include generating a fourth circuit design by removing one or more metal fill shapes positioned around each net of the new set of candidate nets that are positioned within the new radius of removal (e.g., as shown in FIGS. 5A, 5B and 5C) in response to defining or selecting a predetermined new radius of removal for the new set of candidate nets. As described above, the new radius of removal can be larger than the previous radius of removal.

According to some embodiments, identifying a new set of candidate nets based on a comparison of the first set of timing characteristics to the third set of timing characteristics can include, for each net of the set of candidate nets: comparing the first subset of the first set of timing characteristics that are associated with the net to a third subset of the third set of timing characteristics that are associated with the net to determine a new difference in timing characteristics and designating the net as being a new candidate net in response to determining that the new difference in timing characteristics exceeds the predetermined threshold. In some embodiments, generating a fourth circuit design by removing one or more metal fill shapes positioned around each net of the new set of candidate nets that are positioned within the new radius of removal can include defining a new area around the net having the new radius of removal and defining a maximum area of removal (e.g., based on a predefined maximum radius of removal) around the net based on a maximum allowed radius of removal. It may further include leaving the one or more first metal fill shapes in the third circuit design in response to identifying one or more first metal fill shapes that are positioned at least partially outside the maximum area of removal. In other words, according to some embodiments, if any portion of a metal fill shape is disposed outside of a maximum removal area or maximum radius of removal, then then metal fill shape may be prevented from being removed from the circuit design. The step of generating a fourth circuit design can further include removing the one or more second metal fill shapes from the third circuit design in response to identifying one or more second metal fill shapes that are positioned at least partially within the new area (e.g., as shown in FIGS. 4A, 4B and 4C) around the net and are entirely positioned within the maximum area of removal. According to some embodiments, this process of determining candidate nets and removing metal fill shapes in incrementally larger areas can be repeated iteratively until there are either no candidate nets left or until the maximum radius/area of removal has been reached. According to some embodiments, the process may alternatively be executed for a predetermined number of iterations (e.g., two iterations of metal fill shape removal) before ending.

Figure 8:
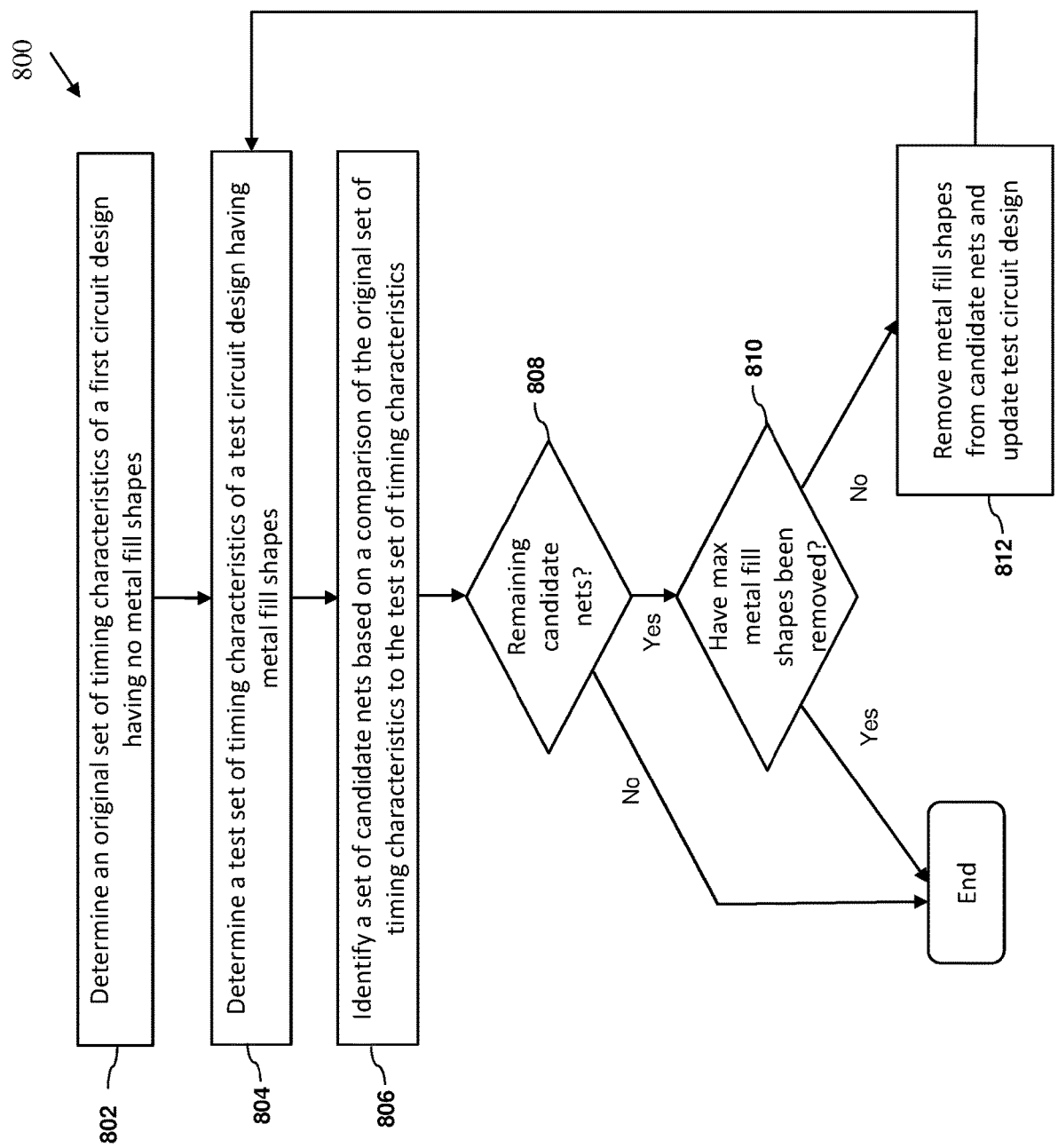
FIG. 8 illustrates a flow diagram of another process for providing improved metal fill shape removal from selected nets in accordance with one or more embodiments of the present invention.

Turning now to FIG. 8, a flow diagram of a method 800 for providing improved metal fill shape removal from selected nets in accordance with an embodiment is shown. In one or more embodiments of the present invention, the method 800 may be embodied in software that is executed by computer elements located included in computer 600 shown in FIG. 6, or within a network that may reside in the cloud, such as the cloud computing environment 50 described herein above and illustrated in FIGS. 9 and 10. In other embodiments, the computer elements may reside on a computer system or processing system, such as the processing system 1100 described herein above and illustrated in FIG. 11, or in some other type of computing or processing environment.

The method 800 begins at block 802 and includes determining an original set of timing characteristics of a first circuit design having no metal fill shapes in a manner similar to that described above with respect to block 702. As shown at block 804, the method includes determining a test set of timing characteristics of a test circuit design having metal fill shapes in a manner similar to that described above with respect to block 704. As shown at block 806, the method includes identifying a set of candidate nets based on a comparison of the original set of timing characteristics to the test set of timing characteristics in a manner similar to that described above with respect to block 706.

As shown at block 808, the method includes determining whether there are any remaining candidate nets. For example, if the prior removal of metal fill shapes was sufficient to reduce the difference in timing characteristics between the first circuit design and the test circuit design, then there may not be any more nets that need further removal of metal fill shapes, in which case the list of candidate nets will be empty. If this is the case, the method may end. If there are still remaining candidate nets, the method may proceed to block 810.

As shown at block 810, the method includes determining whether the maximum amount of metal fill shapes have been removed from the test circuit design. In other words, the system may determine whether, based on the occurrence of one or more previous iterations, the routine has reached the maximum radius/area of removal such that no more metal fill shapes can be removed. According to some embodiments, the maximum radius or area of removal can be a predetermined constant. According to some embodiments, if the maximum radius/area of removal has been reached, then the method may end. However, according to some embodiments, if the maximum radius/area of removal has not been reached, then the method may proceed to block 812, in which the method includes removing metal fill shapes from candidate nets and updating the test circuit design to reflect the removal of the metal fill shapes. The method may then return back to block 804, where a new set of timing characteristics may be determined by running a simulation on the updated test circuit design.

Additional processes may also be included. It should be understood that the processes depicted in FIGS. 7 and 8 represent illustrations, and that other processes may be added or existing processes may be removed, modified, or rearranged without departing from the scope and spirit of the present disclosure.

Figure 9:
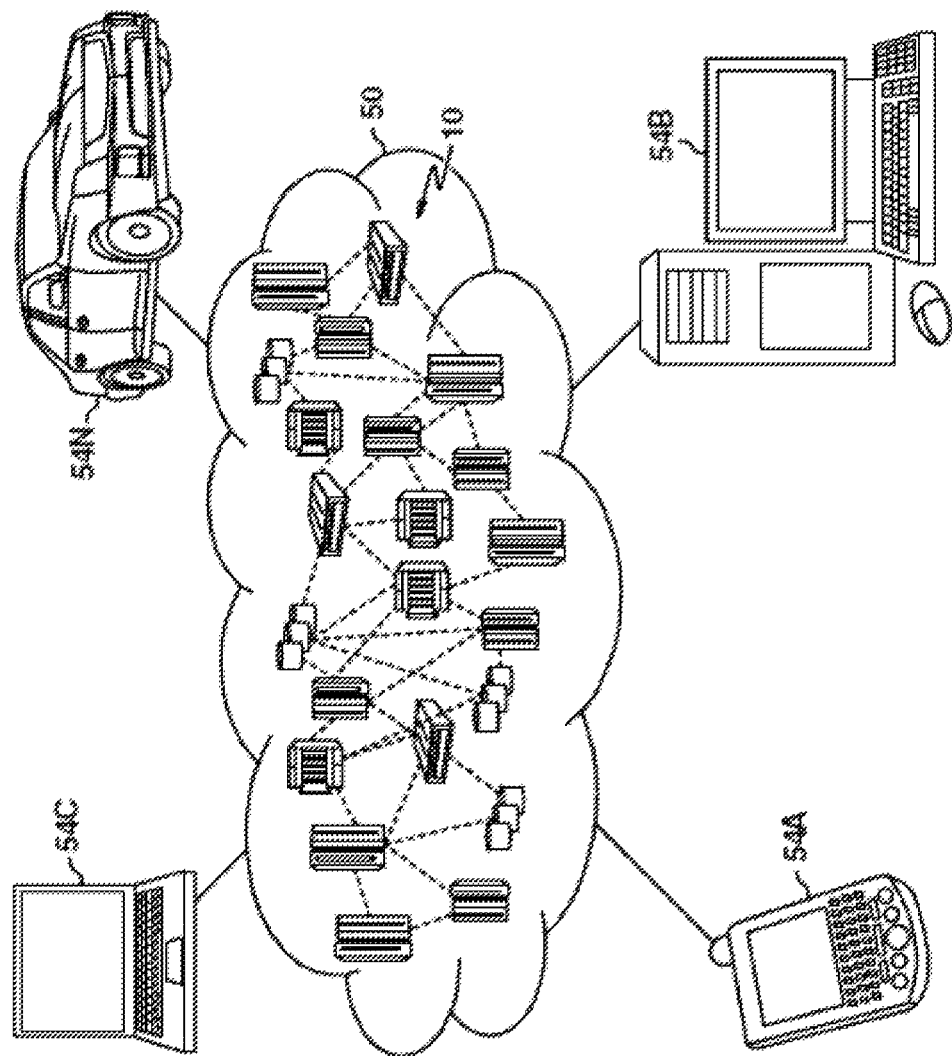
FIG. 9 illustrates a cloud computing environment according to one or more embodiments of the present invention.
Figure 10:
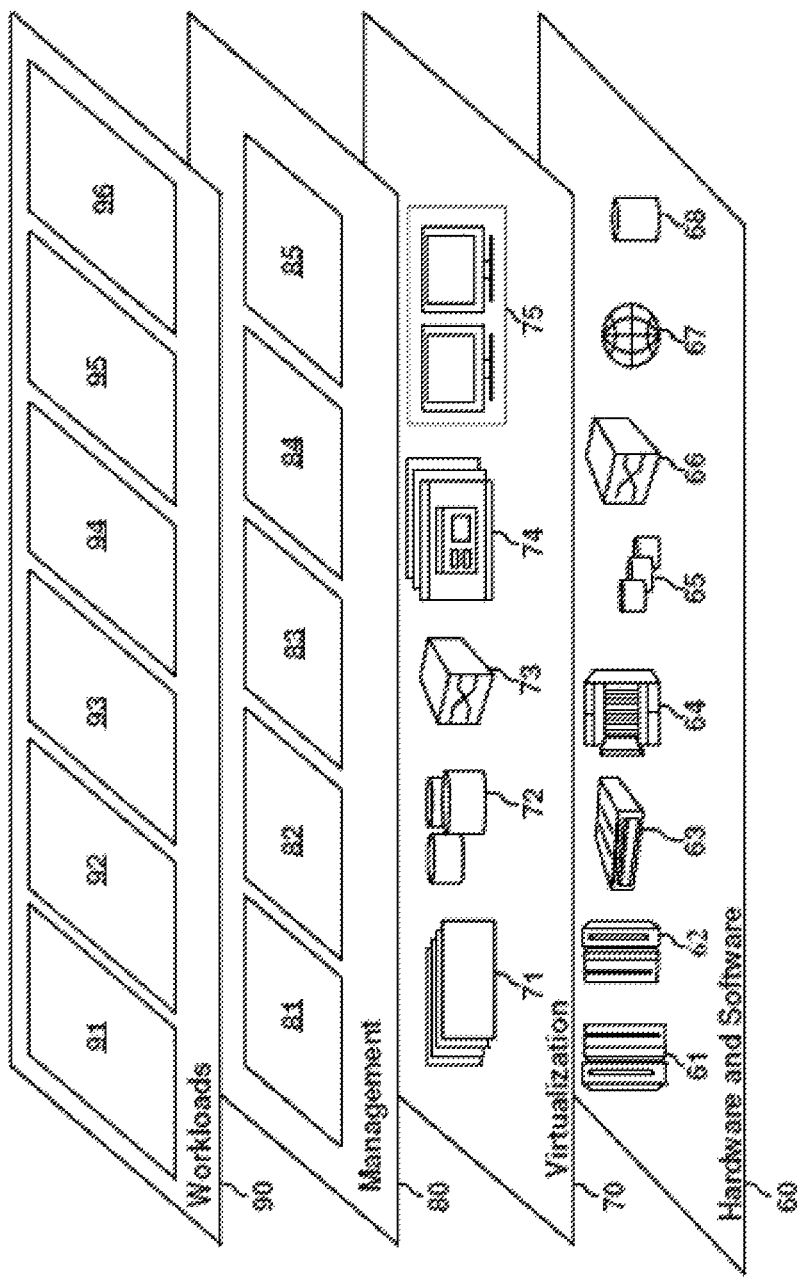
FIG. 10 illustrates abstraction model layers according to one or more embodiments of the present invention.

FIG. 9 depicts a cloud computing environment according to one or more embodiments of the present invention. FIG. 10 depicts abstraction model layers according to one or more embodiments of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing improved metal fill shape removal from selected nets 96.

Figure 11:
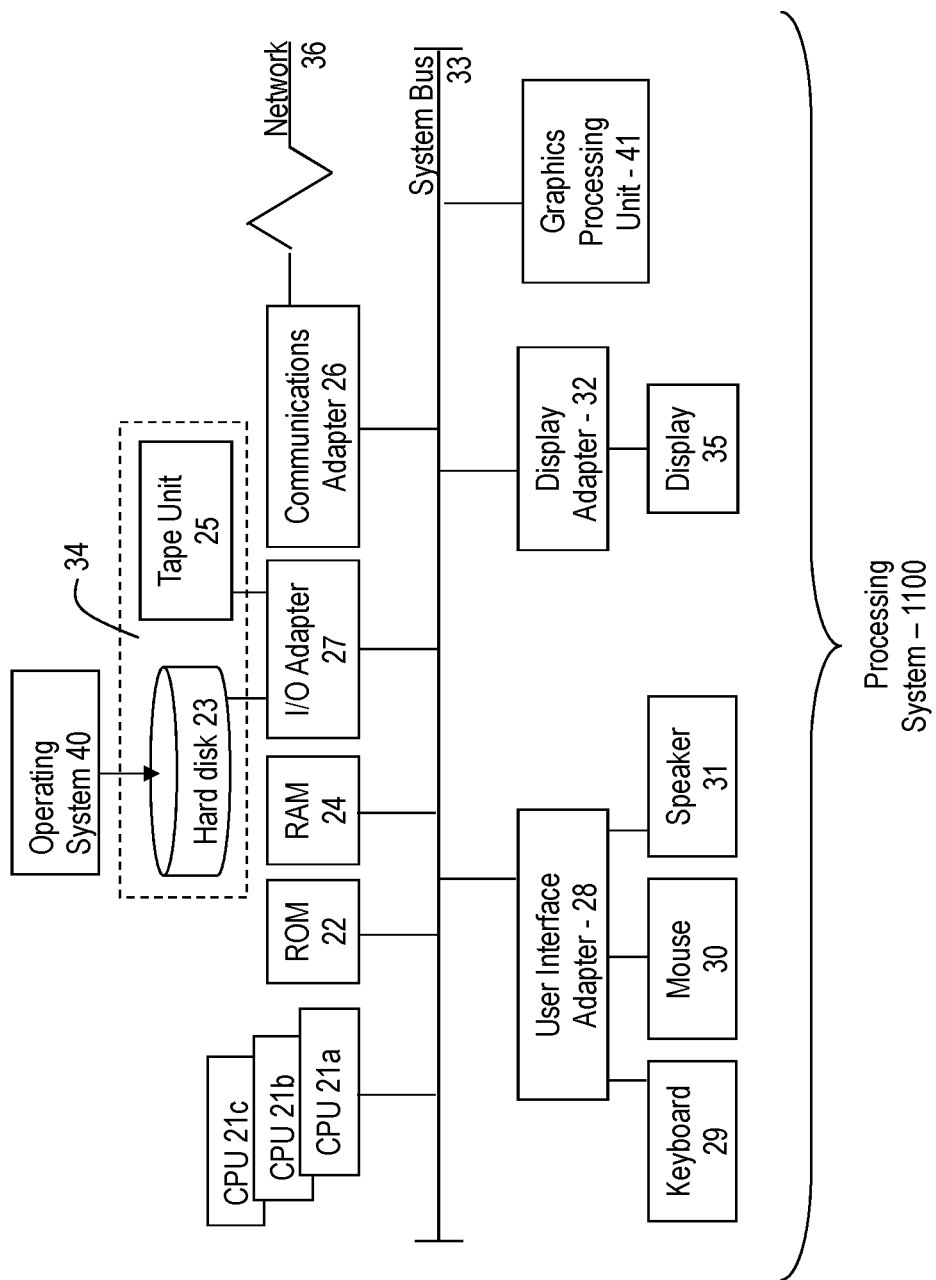
FIG. 11 illustrates a block diagram of a computer system for use in implementing one or more embodiments of the present invention.

FIG. 11 depicts a processing system for implementing one or more embodiments of the present invention. It is understood that one or more embodiments of the present invention are capable of being implemented in conjunction with any other type of computing environment now known or later developed. For example, FIG. 11 depicts a block diagram of a processing system 1100 for implementing the techniques described herein. In accordance with one or more embodiments of the present invention, computer 600 and/or system 1100 can be an example of a cloud computing node 10 in FIG. 9. In the embodiment shown in FIG. 11, processing system 1100 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 1100.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 1100 can be stored in mass storage 34. The RAM 24, ROM 22, and mass storage 34 are examples of memory 19 of the processing system 1100. A network adapter 26 interconnects system bus 33 with an outside network 36 enabling the processing system 1100 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 1100 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 1100 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX@ operating system from IBM Corporation to coordinate the functions of the various components shown in processing system 1100.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of 8% or 5%, or 2% of a given value.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilizes a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    determining a first set of timing characteristics of a first circuit design, wherein the first circuit design does not include metal fill shapes around a plurality of nets;
    determining a second set of timing characteristics of a second circuit design, wherein the second circuit design comprises all elements of the first circuit design and further comprises metal fill shapes positioned around one or more of the plurality of nets;
    identifying a set of candidate nets of the one or more of the plurality of nets based on a comparison of the first set of timing characteristics to the second set of timing characteristics, wherein the set of candidate nets comprises nets that are candidates for metal fill shape removal, the identifying performed for each net of the one or more of the plurality of nets by comparing a first subset of the first set of timing characteristics that are associated with the net to a second subset of the second set of timing characteristics that are associated with the net to determine a difference in timing characteristics, and responsive to determining that the difference in timing characteristics exceeds a predetermined threshold, designating the net as being a candidate net;

defining a radius of removal for the set of candidate nets; and generating a third circuit design by removing one or more metal fill shapes positioned around each net of the set of candidate nets that are positioned within the radius of removal.

2. The computer-implemented method of claim 1, wherein determining the first set of timing characteristics of a first circuit design comprises running a first timing simulation on the first circuit design and determining the second set of timing characteristics of the second circuit design comprises running a second timing simulation on the second circuit design.

3. The computer-implemented method of claim 1, wherein each of the first set of timing characteristics and the second set of timing characteristics comprise a same set of measurements.

4. The computer-implemented method of claim 3, wherein the same set of measurements comprise one or more of slack, hold, slew, noise, functional noise, max % RC delay and max capacitance.

5. The computer-implemented method of claim 1, wherein removing one or more metal fill shapes positioned around each net of the set of candidate nets that are positioned within the radius of removal comprises, for each net of the set of candidate nets:

defining an area around the net having the radius of removal;

identifying one or more metal fill shapes that are positioned at least partially within the area around the net; and removing the one or more metal fill shapes from the second circuit design.

6. The computer-implemented method of claim 5 further comprising:

determining a third set of timing characteristics of the third circuit design;

identifying a new set of candidate nets based on a comparison of the first set of timing characteristics to the third set of timing characteristics, wherein the new set of candidate nets comprises a subset of the set of candidate nets;

defining a new radius of removal for the new set of candidate nets; and generating a fourth circuit design by removing one or more metal fill shapes positioned around each net of the new set of candidate nets that are positioned within the new radius of removal.

7. The computer-implemented method of claim 6, wherein the new radius of removal is larger than the radius of removal.

8. The computer-implemented method of claim 7, wherein identifying a new set of candidate nets based on a comparison of the first set of timing characteristics to the third set of timing characteristics comprises, for each net of the set of candidate nets:

comparing the first subset of the first set of timing characteristics that are associated with the net to a third subset of the third set of timing characteristics that are associated with the net to determine a new difference in timing characteristics; and responsive to determining that the new difference in timing characteristics exceeds the predetermined threshold, designating the net as being a new candidate net.

9. The computer-implemented method of claim 8, wherein generating a fourth circuit design by removing one or more metal fill shapes positioned around each net of the new set of candidate nets that are positioned within the new radius of removal comprises:

defining a new area around the net having the new radius of removal;

defining a maximum area of removal around the net based on a maximum allowed radius of removal;

responsive to identifying one or more first metal fill shapes that are positioned at least partially outside the maximum area of removal, leaving the one or more first metal fill shapes in the third circuit design; and responsive to identifying one or more second metal fill shapes that are positioned at least partially within the new area around the net and are entirely positioned within the maximum area of removal, removing the one or more second metal fill shapes from the third circuit design.

10. A system comprising:

a memory having computer readable instructions; and one or more processors for executing the computer readable instructions, the computer readable instructions controlling the one or more processors to perform operations comprising:

determining a first set of timing characteristics of a first circuit design, wherein the first circuit design does not include metal fill shapes around a plurality of nets;

determining a second set of timing characteristics of a second circuit design, wherein the second circuit design comprises all elements of the first circuit design and further comprises metal fill shapes positioned around one or more of the plurality of nets;

identifying a set of candidate nets of the one or more of the plurality of nets based on a comparison of the first set of timing characteristics to the second set of timing characteristics, wherein the set of candidate nets comprises nets that are candidates for metal fill shape removal, the identifying performed for each net of the one or more of the plurality of nets by comparing a first subset of the first set of timing characteristics that are associated with the net to a second subset of the second set of timing characteristics that are associated with the net to determine a difference in timing characteristics, and responsive to determining that the difference in timing characteristics exceeds a predetermined threshold, designating the net as being a candidate net;

defining a radius of removal for the set of candidate nets; and generating a third circuit design by removing one or more metal fill shapes positioned around each net of the set of candidate nets that are positioned within the radius of removal.

11. The system of claim 10, wherein determining the first set of timing characteristics of a first circuit design comprises running a first timing simulation on the first circuit design and determining the second set of timing characteristics of the second circuit design comprises running a second timing simulation on the second circuit design.

12. The system of claim 10, wherein each of the first set of timing characteristics and the second set of timing characteristics comprise a same set of measurements.

13. The system of claim 12, wherein the same set of measurements comprise one or more of slack, hold, slew, noise, functional noise, max % RC delay and max capacitance.

14. The system of claim 10, wherein removing one or more metal fill shapes positioned around each net of the set of candidate nets that are positioned within the radius of removal comprises, for each net of the set of candidate nets:
　defining an area around the net having the radius of removal;
　identifying one or more metal fill shapes that are positioned at least partially within the area around the net; and
　removing the one or more metal fill shapes from the second circuit design.

15. A computer program product comprising a non-transitory computer readable storage medium having program instructions embodied therewith, the program instructions executable by a computer processor to cause the computer processor to perform a method comprising:
　determining a first set of timing characteristics of a first circuit design, wherein the first circuit design does not include metal fill shapes around a plurality of nets;
　determining a second set of timing characteristics of a second circuit design, wherein the second circuit design comprises all elements of the first circuit design and further comprises metal fill shapes positioned around one or more of the plurality of nets;
　identifying a set of candidate nets of the one or more of the plurality of nets based on a comparison of the first set of timing characteristics to the second set of timing characteristics, wherein the set of candidate nets comprises nets that are candidates for metal fill shape removal, the identifying performed for each net of the one or more of the plurality of nets by comparing a first subset of the first set of timing characteristics that are associated with the net to a second subset of the second set of timing characteristics that are associated with the net to determine a difference in timing characteristics, and responsive to determining that the difference in timing characteristics exceeds a predetermined threshold, designating the net as being a candidate net;
　defining a radius of removal for the set of candidate nets; and
　generating a third circuit design by removing one or more metal fill shapes positioned around each net of the set of candidate nets that are positioned within the radius of removal.

16. The computer program product of claim 15, wherein determining the first set of timing characteristics of a first circuit design comprises running a first timing simulation on the first circuit design and determining the second set of timing characteristics of the second circuit design comprises running a second timing simulation on the second circuit design.

17. The computer program product of claim 15, wherein each of the first set of timing characteristics and the second set of timing characteristics comprise a same set of measurements.

18. The computer program product of claim 15, wherein removing one or more metal fill shapes positioned around each net of the set of candidate nets that are positioned within the radius of removal comprises, for each net of the set of candidate nets:
　defining an area around the net having the radius of removal;
　identifying one or more metal fill shapes that are positioned at least partially within the area around the net; and
　removing the one or more metal fill shapes from the second circuit design.

19. The computer program product of claim 18, wherein the program instructions executable by the computer processor to cause the computer processor to perform:
　determining a third set of timing characteristics of the third circuit design;
　identifying a new set of candidate nets based on a comparison of the first set of timing characteristics to the third set of timing characteristics, wherein the new set of candidate nets comprises a subset of the set of candidate nets;
　defining a new radius of removal for the new set of candidate nets; and
　generating a fourth circuit design by removing one or more metal fill shapes positioned around each net of the new set of candidate nets that are positioned within the new radius of removal.

20. The computer program product of claim 19, wherein the new radius of removal is larger than the radius of removal, and wherein identifying a new set of candidate nets based on a comparison of the first set of timing characteristics to the third set of timing characteristics comprises, for each net of the set of candidate nets:
　comparing the first subset of the first set of timing characteristics that are associated with the net to a third subset of the third set of timing characteristics that are associated with the net to determine a new difference in timing characteristics; and
　responsive to determining that the new difference in timing characteristics exceeds the predetermined threshold, designating the net as being a new candidate net.

* * * * *